United States Patent [19]

Hamada et al.

[11] Patent Number: 5,213,955

[45] Date of Patent: * May 25, 1993

[54] OPTICAL INFORMATION RECORDING MEDIUM AND RECORDING METHOD

[75] Inventors: Emiko Hamada; Yuji Arai; Yosikazu Takagisi; Takashi Ishiguro, all of Tokyo, Japan

[73] Assignee: Taiyo Yuden Co., Ltd., Tokyo, Japan

[*] Notice: The portion of the term of this patent subsequent to Jul. 10, 2007 has been disclaimed.

[21] Appl. No.: 515,421

[22] Filed: Apr. 27, 1990

[30] Foreign Application Priority Data

May 2, 1989 [JP] Japan .................. 1-113198

[51] Int. Cl.$^5$ .................. G03C 1/72; G03F 7/00
[52] U.S. Cl. .................. 430/276; 430/273; 430/275; 430/278; 430/945
[58] Field of Search .............. 430/270, 495, 945, 275, 430/276, 277, 278, 273

[56] References Cited

U.S. PATENT DOCUMENTS

| | | | |
|---|---|---|---|
| 4,696,892 | 9/1987 | Abe et al. | 430/495 |
| 4,740,447 | 4/1988 | Itoh | 430/270 |
| 4,767,693 | 8/1988 | Oba et al. | 430/270 |
| 4,940,618 | 7/1990 | Hamada et al. | 430/945 |
| 4,965,153 | 10/1990 | Imataki et al. | 430/275 |
| 4,990,388 | 2/1991 | Hamada et al. | 428/64 |

FOREIGN PATENT DOCUMENTS 0304050 2/1989 European Pat. Off. .
0353393 2/1990 European Pat. Off. .

OTHER PUBLICATIONS

Patent Abstracts of Japan, Unexamined Applications, vol. 11, No. 328 (P-629) (2775), Oct. 27, 1987, The Patent Office Japanese Government.

*Primary Examiner*—Richard L. Schilling
*Attorney, Agent, or Firm*—Oblon, Spivak, McClelland, Maier & Neustadt

[57] ABSTRACT

An optical information recording medium comprising a light transmitting substrate, a light absorptive layer containing at least one light absorbing substance formed on the substrate and a light reflective layer made of a metal film formed on the light absorptive layer, wherein an optical parameter represented by $\rho = n_{abs} d_{abs}/\lambda$ wherein $n_{abs}$ is the real part of the complex refractive index of the light absorptive layer, $d_{abs}$ is the average thickness of the light absorptive layer and $\lambda$ is the wavelength of a reading laser beam, is $0.6 < \rho < 1.6$.

22 Claims, 2 Drawing Sheets

OPTICAL INFORMATION RECORDING MEDIUM AND RECORDING METHOD

The present invention relates to an optical recording medium having at least an optical absorptive layer and a light reflective layer on a transparent substrate, and a method for recording information on such an optical information recording medium.

As an optical information recording medium capable of recording data by irradiation of a laser beam, an optical information recording medium is known which has a recording layer composed of e.g. a layer of a metal such as Te, Bi or Mn or a layer of a dye such as cyanine, mellocyanine or phthalocyanine and which is designed to record data in such a manner that when irradiated with a laser beam, the recording layer is deformed, sublimed, evaporated or modified to form pits. Further, an optical information recording medium having a recording layer of a dye and a reflective layer of a metal formed on a light transmitting substrate is known.

On the other hand, optical information recording media of so-called ROM (read only memory) type wherein data are already recorded, and no further data are recordable or the recorded data are no longer erasable or rewritable, are widely practically employed in the sound recording and information treating fields. Optical information recording media of this type have no such a recording layer as described above. Pits corresponding to data to be reproduced are already formed on a substrate of e.g. polycarbonate by e.g. press molding, a reflective layer of a metal such as Au, Ag, Cu or Al is formed thereon, and a protective layer is further provided thereon.

The most typical optical information recording medium of this ROM type is a compact disc so-called CD which is widely used in the sound recording and information treating fields. The specification for read-out signals for this CD is standardized, and the reproducing or play back apparatus for CD in accordance with the standards is widely available as compact disc players (CD players).

To satisfy the CD standards, it is required that the reflectance is at least 70%, and with respect to the degree of modulation of the read-out signals, $I_{11}/I_{top}$ is at least 0.6, and $I_3/I_{top}$ is from 0.3 to 0.7.

The above-mentioned writable optical information recording media employ a laser beam in the same manner as CD. Therefore, it is strongly desired for such media to follow the same standards as the widely prevailing standards for CD.

However, conventional writable optical information recording media have a recording layer which is not present in CD, and they are designed to form pits in the recording layer and not in the substrate. Further, in some cases, a space is provided to facilitate the formation of pits in this recording layer, and the reflectance of a laser beam is low as compared with CD. Consequently, the read-out signals are naturally different from those of CD. Therefore, it has been difficult for the conventional optical information recording media to meet the above-mentioned standards for CD. Particularly, the reflectance and the degree of modulation of the read-out signals used to be too low to meet the standards. Therefore, it has been difficult to provide a writable optical information recording medium which satisfies the CD standards.

Therefore, it is an object of the present invention to provide a writable optical information recording medium which has high reflectance and which is capable of providing read-out signals having a high degree of modulation to meet the CD standards.

The present invention provides an optical information recording medium comprising a light transmitting substrate, a light absorptive layer containing at least one light absorbing substance formed on the substrate and a light reflective layer made of a metal film formed on the light absorptive layer, wherein an optical parameter represented by $\rho = n_{abs} d_{abs}/\lambda$ wherein $n_{abs}$ is the real part of the complex refractive index of the light absorptive layer, $d_{abs}$ is the average thickness of the light absorptive layer and $\lambda$ is the wavelength of a reading laser beam, is $0.6 < \rho < 1.6$. The imaginary part $k_{abs}$ of the complex refractive index of the light absorptive layer is preferably at most 0.2.

The present invention also provides a method for recording information on an optical information recording medium, wherein the above optical information recording medium is used, and the recording is conducted by irradiating a laser beam from the substrate side of the medium.

Figure 4:
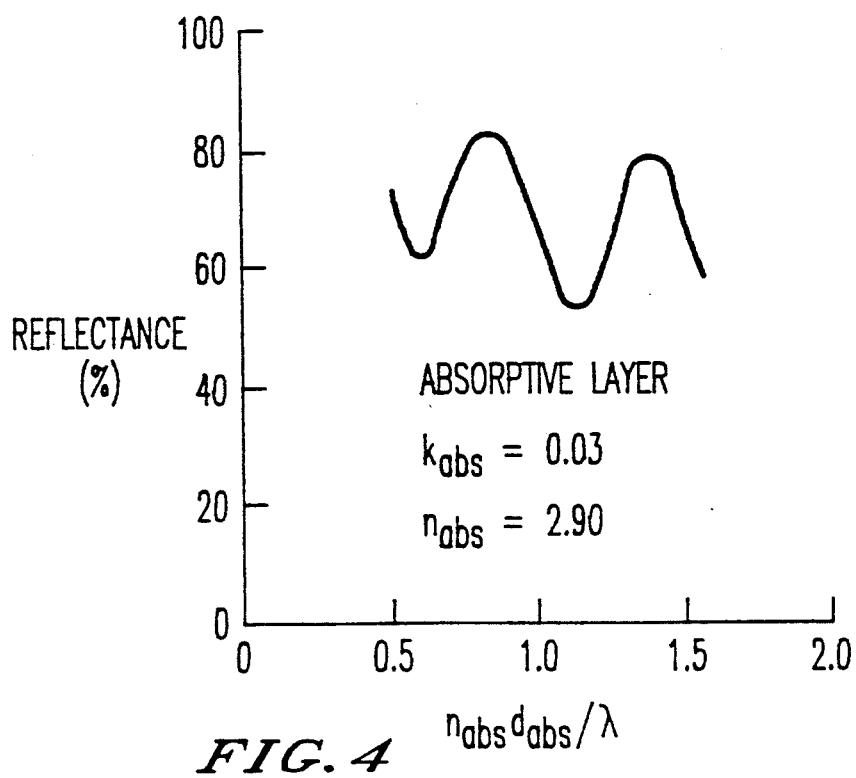

FIG. 4 is a graph showing the relation between the value of $\rho = n_{abs} d_{abs}/\lambda$ wherein $n_{abs}$ is the real part of the complex refractive index of the light absorptive layer of the optical information recording medium of the present invention, $d_{abs}$ is the average thickness of the light absorptive layer and $\lambda$ is the wavelength of the reading laser beam, and the reflectance of the reading laser beam.

Figure 5:
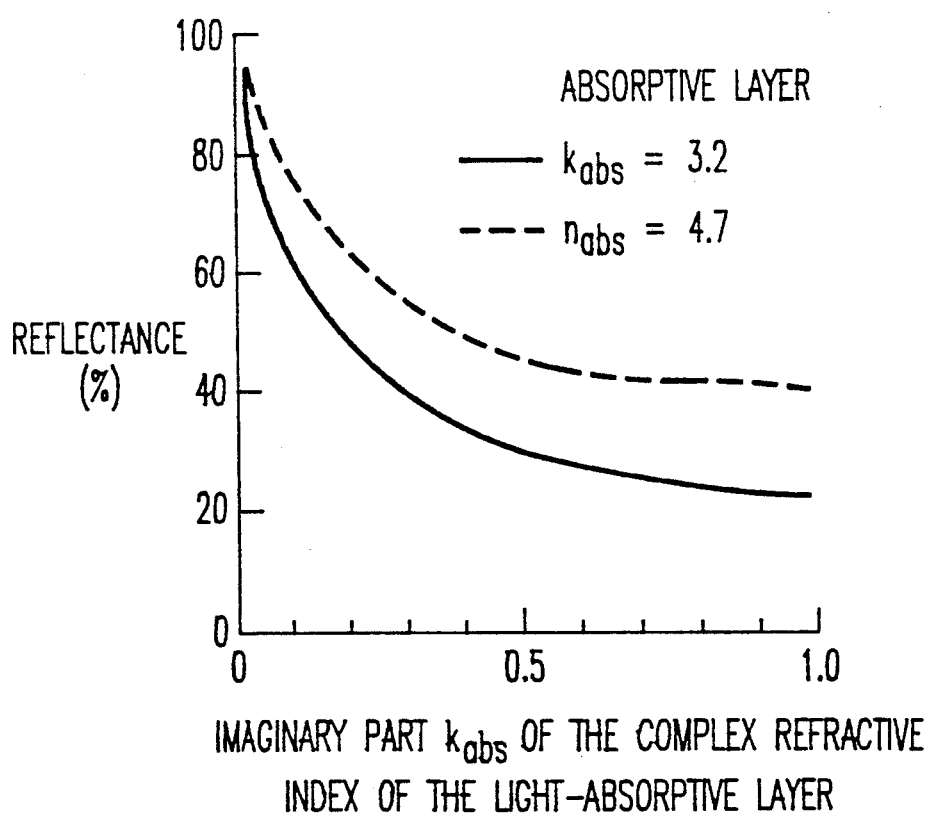

FIG. 5 is a graph showing the relation between the value of the imaginary part $k_{abs}$ of the complex refractive index of the light absorptive layer of the optical information recording medium of the present invention and the reflectance of the reading laser beam.

Now, the present invention will be described in detail.

The present inventors have conducted extensive researches on optical information recording media having a light absorptive layer and a light reflective layer formed on a light transmitting substrate and as a result, have found that the optical parameter $\rho = n_{abs} d_{abs}/\lambda$ wherein wherein $n_{abs}$ is the real part of the complex refractive index of the light absorptive layer, $d_{abs}$ is the average thickness of the light absorptive layer (for the purpose of the present invention, the average thickness is represented by the product obtained by dividing the volume of the light absorptive layer by the area of the region on which the light absorptive layer is formed) and $\lambda$ is the wavelength of the reading laser beam, is an important parameter.

From a further study, it has been found that within a range of $0.6 < \rho < 1.6$, it is possible to secure the standard properties prescribed in the CD standards i.e. the reflectance of at least 70%.

For example, FIG. 4 is a graph showing the relation between the above-mentioned optical parameter $\rho = n_{abs}d_{abs}/\lambda$ and the reflectance of the reading laser beam irradiated from the substrate side, in a case where a polycarbonate substrate and a gold reflective layer were used, and a semiconductor laser beam having a wavelength $\lambda$ of 780 nm was used as the reading laser beam. This graph can be represented by a function which is a combination of an exponential function and a periodic function, whereby the amplitude of the periodic function increases as the value $\rho$ increases.

As is evident from this graph, the reflectance can exceed 70% at the peaks. The amplitude of this periodic function varies depending upon parameters such as the complex refractive indices of the layers constituting the optical information recording medium, their average thicknesses and the uniformity thereof. For example, if the refractive index of a layer located on the incident light side of the light absorptive layer is small, the reflectance shifts to higher in the graph. Further, this graph can be represented by an exponential function having $k_{abs}$ and $d_{abs}$ as parameters, whereby it has been found that the overall decrement of the reflectance in the graph increases as the imaginary part $k_{abs}$ of the complex refractive index of the light absorptive layer increases.

From the simulation prepared by the present inventors, it has been found that so long as the light absorptive layer is homogeneous and there is no nonuniform distribution in the real part $n_{abs}$ of the complex refractive index and in the average thickness $d_{abs}$, there will be no variation in the periodic cycle of the peaks in the graph.

In a case where a groove is provided on the substrate, the reflectance graph may change in a complex manner as compared with the case where no groove is provided, due to the effects of the configuration of the groove or the difference in the thickness of the light absorptive layer between the grooved portion and the land portion. Even in such a case, if the evaluation is made on the average thickness of the light absorptive layer to eliminate the effects of the interference of the groove, there will be no variation in the periodic cycle of this graph.

Under certain conditions, it is also possible to increase the reflectance at the bottoms of the graph by controlling the above-mentioned parameters. However, when the optical parameter $\rho$ is set in the vicinity of the bottoms, it becomes difficult to increase the degree of modulation, and in some cases, the reflectance is likely to increase beyond the level prior to the recording. Thus, the optical parameter $\rho$ is preferably set in the vicinity of the peaks.

From the results of the simulation obtained by the present inventors, it has been found that within a range of $0.6 < \rho < 1.6$, there are two peaks, and the peaks are always located within ranges of $0.6 < \rho < 1.10$ and $1.10 < \rho < 1.6$, and it is possible to obtain high reflectance within such ranges.

When the peak within the range of $0.6 < \rho < 1.10$ is to be used, $\rho$ is preferably set within a range of from $0.61 \leq \rho \leq 1.09$, more preferably within a range of from $0.7 \leq \rho \leq 0.9$.

Likewise, when the peak within the range of from $1.10 < \rho < 1.6$ is to be used, p is preferably set within a range of $1.11 \leq \rho \leq 1.59$, more preferably within a range of from $1.25 \leq \rho \leq 1.5$.

If $0.6 \geq \rho$, the degree of modulation by recording will be smaller than the range specified by the present invention, since the amplitude of the periodic function is small. On the other hand, if $1.6 \leq \rho$, the average thickness of the light absorptive layer tends to be thick, whereby the control of the thickness of the layer will be difficult, and there will be a practical problem in the production.

FIG. 5 illustrates the change in the reflectance when the imaginary part $k_{abs}$ of the complex refractive index of the light absorptive layer is changed from a value close to 0 to 1.0 while maintaining the real part $n_{abs}$ of the complex refractive index at a constant level of 3.2 or 4.7, by changing the light transmittance of the light absorptive layer in an optical information recording medium wherein a gold film is used as the reflective layer, as obtained by simulation. Here, $d_{abs}$ was set at the optimum condition within a range of $0.6 < \rho < 1.10$. It is evident from this graph that if $k_{abs}$ is larger than 0.2, it becomes difficult to obtain a high reflectance at a level of at least 70%. The closer the value $k_{abs}$ to 0, the higher the reflectance. However, if $k_{abs}$ is too close to 0, the sensitivity will be poor. Therefore, $k_{abs}$ is preferably at least 0.001. When the optical parameter $\rho = n_{abs}d_{abs}/\lambda$ is within a range of $0.61 \leq \rho \leq 1.09$, $k_{abs}$ is preferably within a range of from $0.01 \leq k_{abs} \leq 0.2$. When the prescribed values other than the reflectance and the degree of modulation prescribed in the CD standards, such as the push pull value, etc., are taken into consideration, the optical parameter $\rho = n_{abs}d_{abs}/\lambda$ is preferably $0.7 \leq \rho \leq 0.9$, and at the same time $k_{abs}$ is preferably $0.01 \leq k_{abs} \leq 0.1$.

When the optical parameter $\rho = n_{abs}d_{abs}/\lambda$ is within a range of $1.11 \leq \rho \leq 1.59$, $k_{abs}$ is preferably $0.001 \leq k_{abs} \leq 0.2$. When the prescribed values other than the reflectance and the degree of modulation prescribed in the CD standards, such as the push pull value, etc., are taken into consideration, the optical parameter $\rho = n_{abs}d_{abs}/\lambda$ is preferably $1.25 \leq \rho \leq 1.5$, and at the same time $k_{abs}$ is preferably $0.01 \leq k_{abs} \leq 0.08$.

Such definitions of the present invention are applicable even when other layers are provided. For example, in a case where a transparent layer such as an enhancing layer of e.g. $SiO_2$ or a primer layer, is provided between the substrate 2 and the light absorptive layer 3, such a transparent layer may be taken as a part of the substrate, and in a case where a layer such as an adhesive layer or a hard layer, is provided between the light absorptive layer and the light reflective layer, such an additional layer may be taken as a second light absorptive layer, and the optical parameter $\rho$ will be $\rho = (n_1 \cdot d_1 + n_2 \cdot d_2)/\lambda$. In a case of a plurality of layers, the optical parameter $\rho$ will be $\rho = \Sigma(n_i \cdot d_i)/\lambda$ where i is an integer and $n_i$ is the real part of the complex refractive index of each layer, and $d_i$ is the average thickness of each layer. In this manner, even the case involving a plurality of layers, can be dealt with in the same way.

Likewise, a composite complex refractive index K representing the average of a plurality of $k_{abs}$, can be obtained by $K = \Sigma d_i \cdot k_i / \Sigma d_i$ where $k_i$ is the imaginary part of the complex refractive index of each layer, and thus this case can be dealt with in the same manner as in the case of a single layer.

Now, specific embodiments of the present invention will be described in detail with reference to the drawings.

Figure 1:
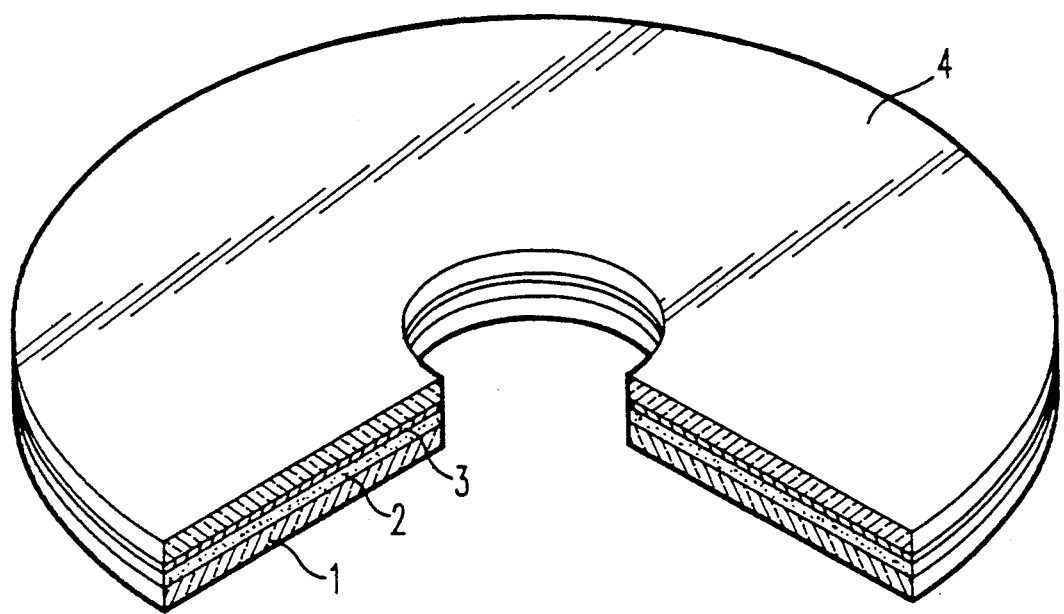
FIG. 1 is a partially cross-sectional diagrammatical perspective view illustrating an embodiment of the structure of the optical information recording medium of the present invention.
Figure 2:
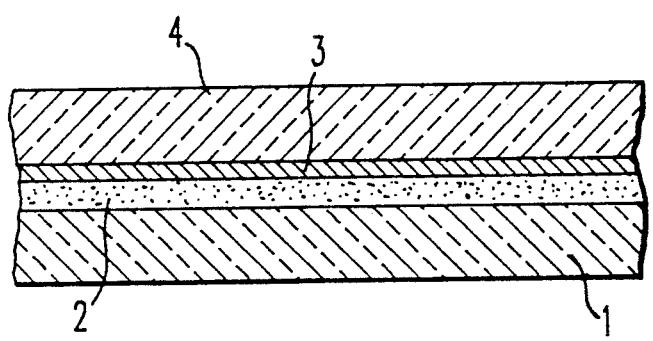
FIG. 2 is a cross-sectional enlarged view, taken along the track, of a part of the optical information recording medium of FIG. 1 prior to the optical recording.
Figure 3:
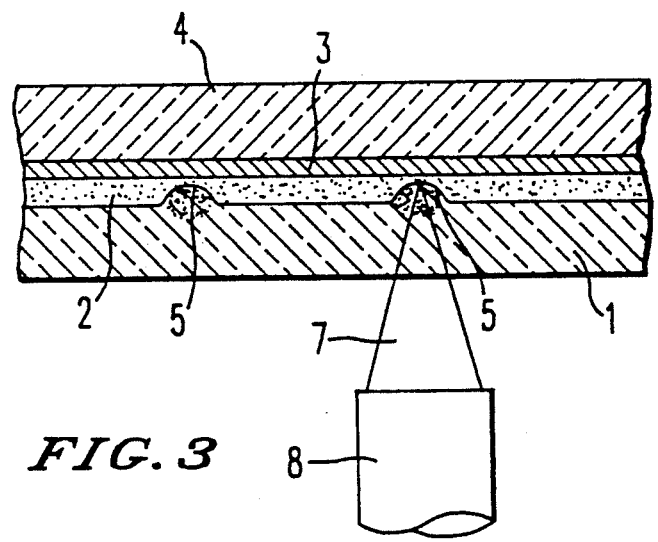
FIG. 3 is a cross-sectional enlarged view, taken along the track, of a part of the optical information recording medium of FIG. 1 after the optical recording.

FIGS. 1 to 3 diagrammatically illustrate an embodiment of the structure of the optical information recording medium of the present invention. In these Figures, reference numeral 1 indicates a light transmitting substrate, numeral 2 indicates a light absorptive layer formed thereon, numeral 3 indicates a light reflective layer formed thereon, and numeral 4 indicates a protective layer formed thereon.

FIG. 2 diagrammatically illustrates the state prior to the recording by a laser beam, and FIG. 3 diagrammatically illustrates the state after the recording.

The light transmitting substrate 1 is made of a material having high transparency with a refractive index within a range of from 1.0 to 1.8 to laser beams and is usually made of a resin having excellent impact strength. For example, a polycarbonate substrate, an acrylate resin substrate or an epoxy resin substrate can be employed. In some cases, a glass substrate or the like may be employed. To satisfy the CD standards, the thickness is preferably within a range of from 1.1 to 1.5 mm. Further, an intermediate layer such as a solvent resistant layer or an enhancing layer of e.g. $SiO_2$, may be formed between the substrate and the light absorptive layer. Such a substrate can be molded by any suitable molding method. However, an injection molding method is preferred.

A spiral pregroove for tracking may be formed on the surface of the substrate on which the light absorptive layer is to be formed. The pitch of the groove i.e. the so-called tracking pitch, is preferably about 1.6 μm. The pregroove is usually formed by pressing a stamper at the time of the injection molding. However, it may be formed by cutting with a laser beam or by a 2P method (photo-polymer method).

The light absorbing substance to be used for the light absorptive layer 2, is preferably an organic dye, particularly a cyanine dye so that the numerical values for $n_{abs}$ and $k_{abs}$ can easily be set. However, any other known light absorbing substances may be employed, so long as the effects of the present invention can be obtained.

As the light absorbing organic dye, a polymethine dye, a triarylmethane dye, a pyrylium dye, a tetradehydrocholine dye, a triarylamine dye, a squarylium dye, a croconic methine dye and a mellocyanine dye may, for example, be mentioned. However, the organic dye is not limited to such specific examples.

Specifically, the following dyes may be mentioned.

Polymethine dyes

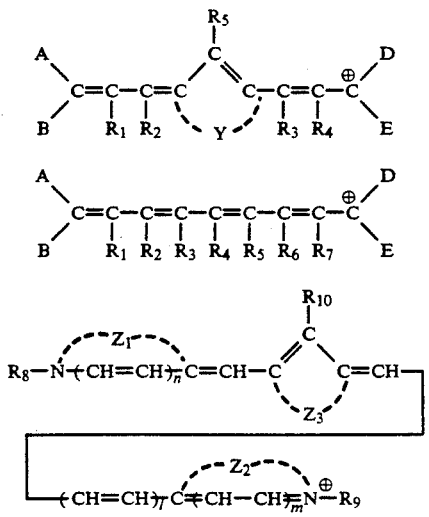

-continued
Polymethine dyes

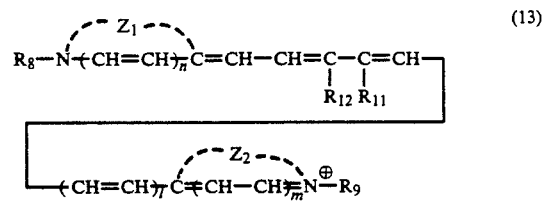

In the above chemical formulas (10) to (13), each of A, B, D and E is a substituted or unsubstituted aryl group, each of $R_1$, $R_2$, $R_3$, $R_4$, $R_5$, $R_6$ and $R_7$ which may be the same or different, is a hydrogen atom, a halogen atom or an alkyl group, Y is a residue having a group of atoms required to complete a 5- or 6-membered ring, each of $R_8$ and $R_9$ which may be the same or different, is a substituted or unsubstituted alkyl group, a substituted or unsubstituted aralkyl group or an alkenyl group, each of $Z_1$ and $Z_2$ is a group of atoms required to complete a substituted or unsubstituted hetero ring, $Z_3$ is a group of atoms required to complete a substituted or unsubstituted 5- or 6-membered ring, said 5- or 6-membered ring may be condensed with an aromatic ring, $R_{10}$ is a hydrogen atom or a halogen atom, each of $R_{11}$ and $R_{12}$ is a hydrogen atom, a halogen atom, a hydroxyl group, a carboxyl group, an alkyl group, a substituted or unsubstituted aryl group or an acyloxy group, and each of l, m and n is 0 or 1.

Triarylmethane dyes

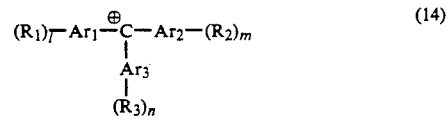

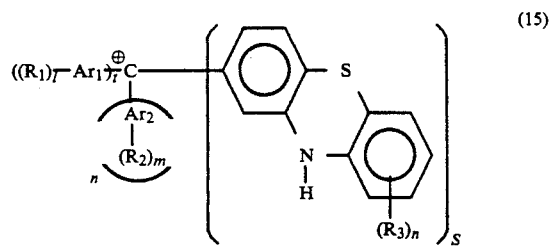

In the above chemical formulas (14) and (15), each of $R_1$, $R_2$ and $R_3$ which may be the same or different, is a hydrogen atom, a hydroxyl group, a halogen atom, a $C_1$-$C_{20}$ alkyl group or $-N(C_1$-$C_{10}$alkyl$)_2$, each of l, m and n is an integer of from 0 to 9, each of $Ar_1$, $Ar_2$ and $Ar_3$ which may be the same or different, is a substituted or unsubstituted aryl group, and each of s, t and u is an integer of from 0 to 3, provided that $s+t+u=3$.

Pyrylium dyes

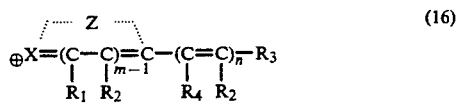

-continued

Pyrylium dyes

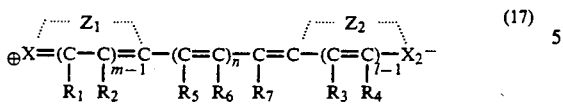

In the above chemical formulas (16) and (17), each of X, $X_1$ and $X_2$ is a sulfur atom, an oxygen atom or a selenium atom, each of Z and $Z_1$ is a hydrocarbon group comprising a group of atoms required to complete a substituted or unsubstituted pyrylium, thiopyrylium, selenapyrylium, benzopyrylium, benzothiopyrylium, benzoselenapyrylium, naphthopyrylium, naphthothiopyrylium or naphthoselenapyrylium, $Z_2$ is a hydrocarbon group comprising a group of atoms required to complete substituted or unsubstituted pyrane, thiopyrane, selenapyrane, benzopyrane, benzothiopyrane, benzoselenapyrane, naphthopyrane, naphthothiopyrane or naphthoselenapyrane, each of $R_1$, $R_2$, $R_3$ and $R_4$ is a hydrogen atom, a substituted or unsubstituted alkyl group or a substituted or unsubstituted aryl group, each of $R_5$, $R_6$ and $R_7$ is a hydrogen atom, a halogen atom, a substituted or unsubstituted alkyl group, a substituted or unsubstituted aryl group or a substituted or unsubstituted aralkyl group, each of m and l is 1 or 2, and n is 0, 1 or 2.

Phenanthrene dyes

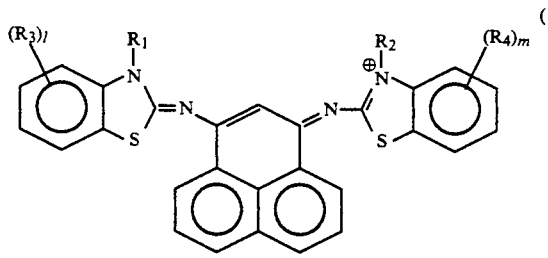

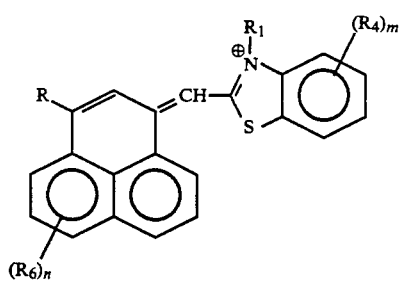

In the above chemical formulas (18) and (19), each of $R_1$ and $R_2$ is an alkyl group, each of $R_3$, $R_4$ and $R_5$ is a hydrogen atom, a hydroxyl group, a halogen atom, a substituted or unsubstituted alkyl, aryl, aralkyl, amino or alkoxy group, R is

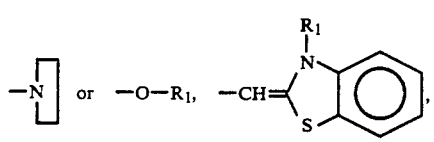

and each of l, m and n is an integer of from 0 to 6.

Tetrahydrocholine dyes

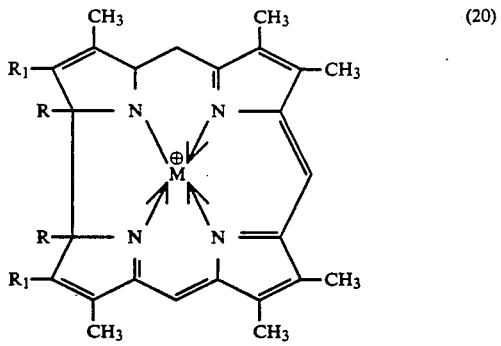

In the above chemical formula (20), R is an alkyl group or a carboxyalkyl group such as $COOC_2H_5$, $R_1$ is a hydrogen atom or an alkyl group, and M is H, Ni(II), Co(II) or Co(III).

Triarylamine dyes

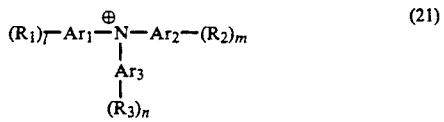

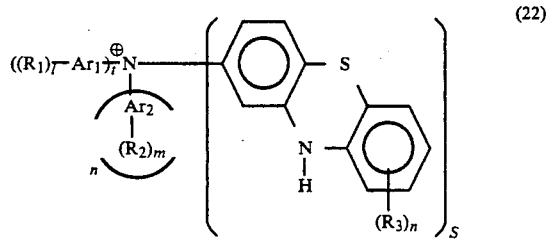

In the above chemical formulas (21) and (22), $R_1$ to $R_3$, l, m, n, $Ar_i$ to $Ar_3$, s, t and u are as defined with respect to the above chemical formulas (14) and (15).

The counter ions to the dye cations of the above chemical formulas (10) to (22) may be acid anions such as a chloride ion, a bromide ion, an iodide ion, a perchloric acid ion, a benzene sulfonic acid ion, a p-toluenesulfonic acid ion, a methylsulfuric acid ion, an ethylsulfuric acid ion and a propylsulfuric acid ion.

Squarylium dyes

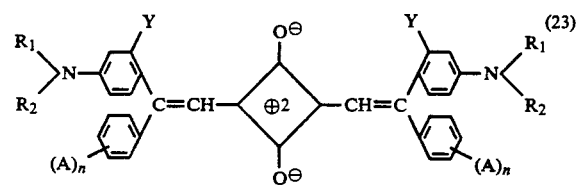

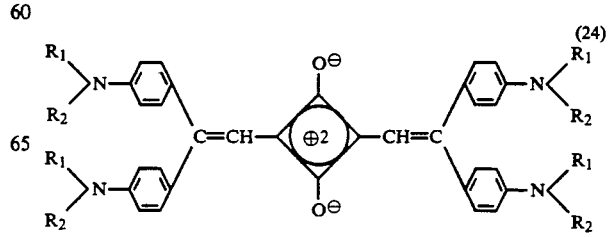

Squarylium dyes

In the above chemical formulas (23) and (24), A is a hydrogen atom, a halogen atom, an alkyl group, an alkoxy group, a nitro group, a cyano group, a trifluoromethyl group or

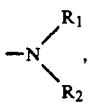

and n is an integer of from 0 to 5, provided that when n is from 2 to 5, a plurality of A may be the same or different, Y is a hydrogen atom, an alkyl group, a halogen atom or a hydroxyl group, and each of $R_1$ and $R_2$ is an alkyl group, a substituted or unsubstituted phenyl group, a substituted or unsubstituted benzyl group or an allyl group.

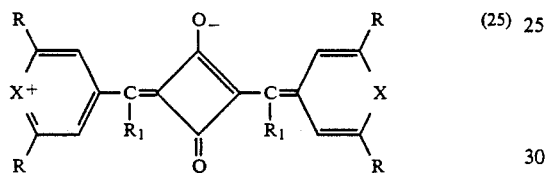
(25)

In the above chemical formula (25), X is an oxygen atom or a sulfur atom, R is an alkyl group having at least one carbon atom, and $R_1$ is a hydrogen atom or a methyl group.

Croconic methine dyes

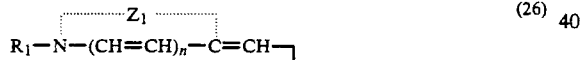
(26)

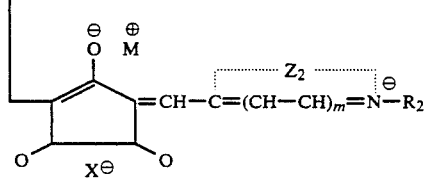

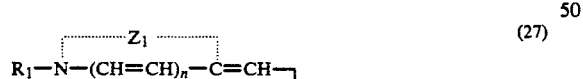
(27)

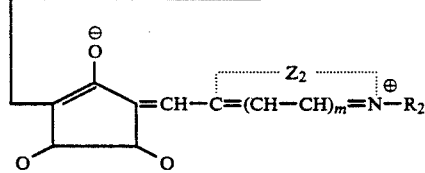

In the above chemical formulas (26) and (27), each of $R_1$ and $R_2$ is a substituted or unsubstituted alkyl group, a cyclic alkyl group, an allyl group, a substituted or unsubstituted aralkyl group or a substituted or unsubstituted aryl group, and each of $Z_1$ and $Z_2$ is a group of non-metal atoms required to complete a substituted or unsubstituted hetero ring, each of m and n is 0 or 1, $M^+$ is a cation, and X is an anion.

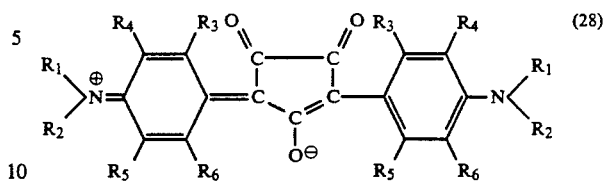
(28)

In the above chemical formula (28), each of $R_1$ and $R_2$ is an alkyl group, or $R_1$ and $R_2$ may form a ring together with the nitrogen atom, each of $R_3$, $R_4$, $R_5$ and $R_6$ is a hydrogen atom, a halogen atom, an alkyl group, an alkoxy group or a hydroxyl group, or $R_1$ and $R_2$ may bond to each other to form a benzene ring, and $R_3$ and $R_4$, and $R_5$ and $R_6$ may respectively bond to each other to form a benzene ring.

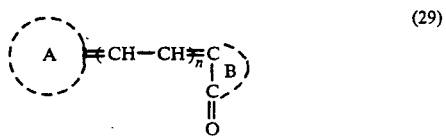
(29)

In the above chemical formula (29), A represents the following rings:

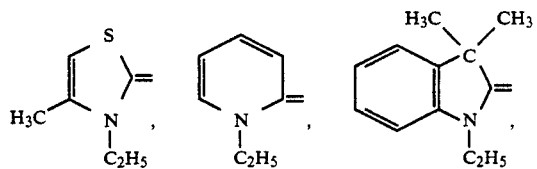

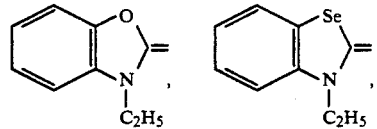

represents the following rings:

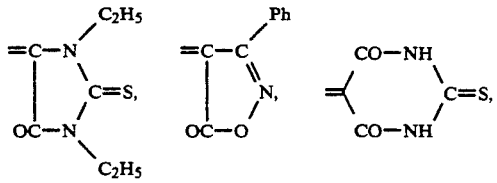

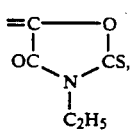 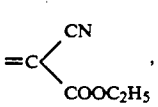 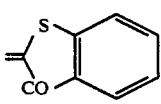

and n is 1 or 2.

A preferred cyanine dye as the material to be used for the light absorptive layer 2 of the optical information recording medium of the present invention, is represented by the following formula i.e. a dye having a structure in which the heterocyclic rings are linked by a methine chain:

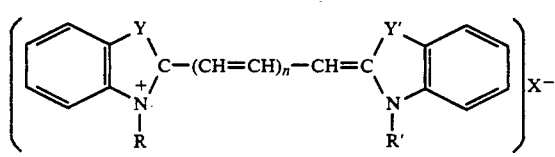

In the above chemical formula, each of Y and Y' is O, S, Se, NH, —CH=CH— or $CH_3$—C—$CH_3$, each of R and R' is an alkyl group, X is an atom or molecule capable of forming an anion such as a halogen atom, and n is 0, 1, 2 or 3.

Specifically, an indolenine-type cyanine dye and a thiazole-type cyanine dye may, for example, be mentioned. The following examples may be given.

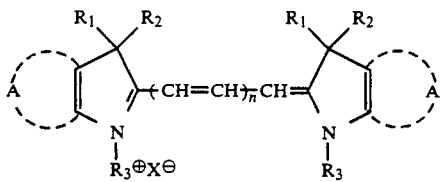

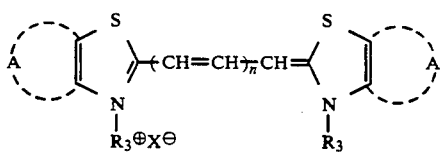

In the above chemical formulas (30) and (31), each of $R_1$, $R_2$ and $R_3$ which may be the same or different, is a $C_1$-$C_6$ alkyl group, X is a halogen atom, a perhalogeno acid, tetrafluoroboric acid, toluenesulfonic acid or an alkylsulfuric acid, A is a benzene ring or a naphthyl ring, which may be substituted by an alkyl group, an alkoxy group, a hydroxyl group, a carboxyl group, a halogen atom, an allyl group or an alkylcarboxyl group, and n is an integer of from 0 to 3.

Further, an alkyl group or a halogen atom may be substituted on each carbon atoms constituting the methine chain, and X may be a metal complex anion as identified below.

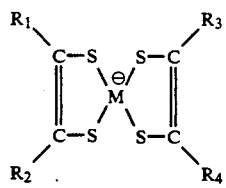

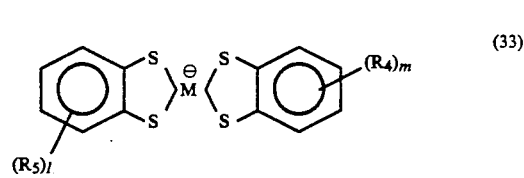

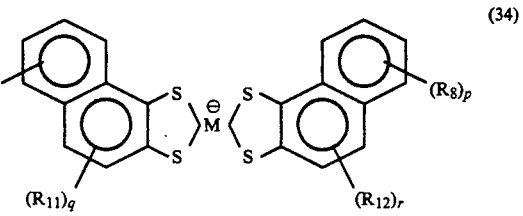

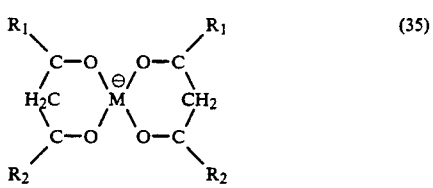

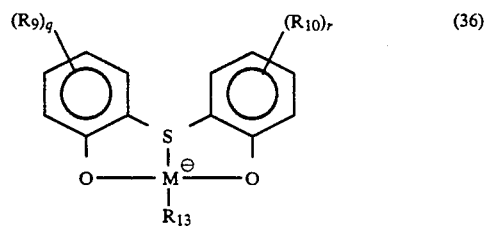

In the above chemical formulas (32) to (36), M is a transition metal such as Ni, Co, Mn, Cu, Pd or Pt, each of $R_1$ to $R_4$ which may be the same or different, is a substituted or unsubstituted alkyl, aryl or amino group, each of $R_5$ to $R_{12}$ which may the same or different, is a hydrogen atom, a halogen atom or a substituted or unsubstituted alkyl, acyl, alkoxy, acyloxy, aryl, alkenyl or amino group, $R_{13}$ is a substituted or unsubstituted amino group, each of l, m, n, p, q and r is an integer of from 0 to 4, and each of u and v is an integer of from 0 to 2.

However, the present invention is by no means restricted to the above-mentioned cyanine dyes, and other cyanine dyes such as a quinoline-type cyanine dye, an oxazol type cyanine dye, may provide the effects of the present invention, so long as they are light absorbing cyanine dyes.

The indodicarbocyanine as a further preferred cyanine dye to obtain the effects of the present invention, is represented by the following formula:

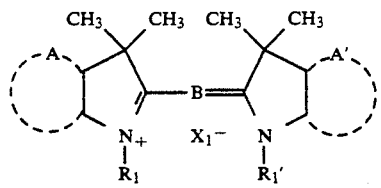

wherein each of A and A' which may be the same or different is a group of atoms forming a benzene ring, a substituted benzene ring, a naphthalene ring or a substituted naphthalene ring, B is pentamethylene (—CH=CH—CH=CH—CH=), of which each hydrogen atom may be substituted by a halogen atom, an alkyl group, an alkoxy group or a diphenylamino group, or which may have a substituted or unsubstituted cyclic side chain bridging a plurality of Carbon atoms, each of $R_1$ and $R_1'$ which may be the same or different is a substituted or unsubstituted alkyl, alkoxy, alkylhydroxy, aralkyl, alkenyl, alkylcarboxyl or alkylsulfonyl group, or a substituted or unsubstituted alkylcarboxyl or alkylsulfonyl group bonded to an alkali metal ion or an alkyl group, and $X_1^-$ is an anion such as a halogen atom, perchloric acid, borofluoric acid, benzenesulfonic acid, toluenesulfonic acid, an alkylsulfonic acid, a benzenecarboxylic acid, an alkylcarboxylic acid or a trifluoromethylcarboxylic acid, provided that when $R_1$ and $R_1'$ have a group bonded to an alkali metal ion, $X_1^-$ may be not present.

As the substituents A and A' of the cyanine dye represented by the foregoing formula, a substituted or unsubstituted benzene ring and a substituted or unsubstituted naphthalene ring may be mentioned. The substituents thereof include, for example, an alkyl group, an alkoxy group, a hydroxyl group, a carboxyl group, a halogen atom, an allyl group, an alkylcarboxyl group, an alkylalkoxy group, an aralkyl group, an alkylcarbonyl group, a sulfonate alkyl group bonded with a metal ion, a nitro group, an amino group, an alkylamino group, an aryl group, a phenylethylene group and the following:

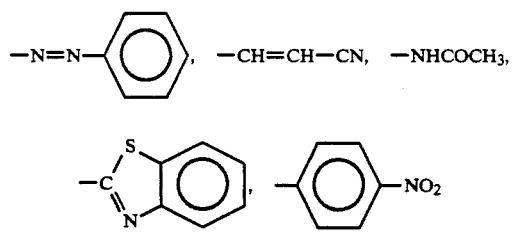

Further, a combination of a plurality of indolenine cyanines having such substituents may be employed. For example, substituents for the substituents A and A' of such compounds may be, for example, as shown in Table 1.

TABLE 1

| First cyanine | Second cyanine |
|---|---|
| —$C_nH_{2n+1}$(n = 1, 2, 3, 4) | —$NO_2$ |
| —$NO_2$ | —$OC_nH_{2n+1}$(n = 1, 2, 3, 4) |
| —$C_nH_{2n+1}$(n = 1, 2, 3, 4) | —$OC_nH_{2n+1}$(n = 1, 2, 3, 4) |

TABLE 1-continued

| First cyanine | Second cyanine |
|---|---|
| —N$\begin{matrix}C_nH_{2n+1}\\ \\C_nH_{2n+1}\end{matrix}$ (n = 1, 2, 3, 4) | —$C_nH_{2n+1}$(n = 1, 2, 3, 4) |
| —N$\begin{matrix}C_nH_{2n+1}\\ \\C_nH_{2n+1}\end{matrix}$ (n = 1, 2, 3, 4) | —$C_nH_{2n+1}$(n = 1, 2, 3, 4) |
| —N$\begin{matrix}C_nH_{2n+1}\\ \\C_nH_{2n+1}\end{matrix}$ (n = 1, 2, 3, 4) | —$OC_nH_{2n+1}$(n = 1, 2, 3, 4) |

As the cyclic side chain bonding to B of the foregoing formula, a linking chain may be mentioned which is composed of carbon or other atoms forming e.g. a 4-membered, 5-membered or 6-membered ring together with a plurality of carbon atoms of the pentamethine chain by bridging e.g. the second and fourth carbon atoms, and it may have a substituent. The substituents directly attached to B or located on the above cyclic side chain, include a halogen atom, a diphenylamino group, an alkoxy group (e.g. a lower alkoxy group such as methoxy or ethoxy), and an alkyl group (e.g. a lower alkyl group such as methyl or ethyl).

The light absorptive layer may contain in addition to the above cyanine dye, other dyes, resins (e.g. a thermoplastic resin such as nitrocellulose, or a thermoplastic elastomer), liquid rubber, etc. Specifically, there may be mentioned, in addition to those mentioned in the following Examples, a thermoplastic resin such as isobutylene, a maleic anhydride copolymer, an ethylene-vinyl acetate copolymer, a carboxyvinyl polymer, a chlorinated polypropylene, a polyethylene oxide, a polyamide (nylon 6, nylon 12 or methoxymethylated polyamide), a cumarone resin, a ketone resin, a polyvinyl acetate, a polystyrene, PVA (polyvinyl alcohol) or PVE (polyvinyl ester), a cellulose derivative such as carboxymethyl cellulose, nitrocellulose, HPC (hydroxypropyl cellulose), HEC (hydroxyethyl cellulose), MC (methyl cellulose), EC (ethyl cellulose), EHEC (ethyl hydroxyethyl cellulose) or CMEC (carboxymethyl ethyl cellulose), an oligomer such as oligostyrene or methylstyrene oligomer, and an elastomer rubber such as a styrene block copolymer or a urethane-type thermoplastic elastomer.

In the case of an organic dye, this light absorptive layer 2 is formed by coating a solution of such an organic dye in a known organic solvent such as acetylacetone, methyl cellosolve or toluene, on the surface of the above substrate 1. For the coating, a vapor deposition method, a LB method or a spin coating method may, for example, be employed. Among them, a spin coating method is preferred, since it is thereby possible to readily control the thickness of the light absorptive layer 2 by adjusting the concentration or viscosity of the coating material, or the drying rate of the solvent.

The organic solvent may be an alcohol such as methanol, ethanol, propanol, isopropyl alcohol, butanol, amyl alcohol, isoamyl alcohol, hexyl alcohol, heptanol, benzyl alcohol, cyclohexanol or furfuryl alcohol; an ether such as cellosolve, diethyl cellosolve, butyl cellosolve, methyl carbitol, carbitol, acetal, dioxane or tetrahydrofuran; a ketone such as acetone, methyl ethyl ketone, methyl isobutyl ketone, diacetone alcohol, cyclohexanone or acetophenone; an ester such as ethyl formate, butyl formate, amyl formate, methyl acetate, ethyl acetate, propyl acetate, butyl acetate, amyl acetate, phenyl acetate, methyl cellosolve acetate or cellosolve acetate; nitrohydrocarbon such as nitromethane, nitroethane, nitropropane, nitrobutanol or nitrobenzene; a halogenated solvent such as methyl chloride, methylene chloride, chloroform, methyl bromide, bromoform, methylene iodide, ethyl chloride, ethylene chloride, ethylidene chloride, trichloroethane, trichloroethylene, propylene chloride, butyl chloride, dichlorobutane, hexachloropropylene, dichloropentane, amyl chloride, chlorobenzene, o-dichlorobenzene, trichlorobenzene, trichlorotoluene or dichlorotoluene; or other solvents such as paraldehyde, crotonaldehyde, furfural, aldol, acetonitrile, formamide, dimethylformamide, acetol, γ-valerolactone, amylphenol, sulfone, 2-mercaptoethyl alcohol, dimethylsulfoxide, N-methylpyrrolidone or methyl carbamate, These oranic solvents may be contained in the light absorptive layer.

Further, the light absorptive layer of the present invention may be formed by using a plurality of light absorbing substances.

The light reflective layer 3 is a metal film, which si formed by e.g. vapor depositing or sputtering gold, silver, copper, aluminum or an alloy thereof. Since the reflectance is required to be at least 70%, it is preferred to employ a metal film composed mainly of gold or an alloy containing gold, among them.

The protective layer 4 is formed with a resin excellent in the impact resistance similar to the light transmitting substrate 1. It is usually formed by coating an ultraviolet curable resin by spin coating, followed by irradiation with ultraviolet rays for curing. As other materials, an epoxy resin, an acrylate resin, a silicone hard coat resin, etc. may be used. In order to provide a buffering effect, it may be formed with an elastic material such as an urethane resin.

In the optical information recording medium of the present invention, a layer behind the light absorptive layer 2 relative to the light transmitting substrate 1, such as the light reflective layer 3 or the protective layer, 4, is preferably made of a material having a heat distortion temperature and a hardness higher than the layer on which pits 5 are formed. By forming the layer behind the absorptive layer 2 with a hard material, the block error rate of recorded signals can effectively be reduced, whereby it is readily possible to meet the standard requirement of BLER (block error rate) being not higher than $3 \times 10^{-2}$ as prescribed in the CD standards.

Further, an intermediate layer such as an oxidation resistant layer to prevent the oxidation of the reflective layer 3, may be interposed between the reflective layer 3 and the protective layer 4.

By using the optical information recording medium constructed as described above, recording is conducted by irradiating a laser beam to the light absorptive layer from the substrate side in such a manner that while rotating the optical information recording medium and tracking with a tracking guide means, for example, along the pregroove, a laser spot corresponding to the signal modulated in accordance with the CD standards, is irradiated by a pick up. The wavelength λ of the recording laser beam is preferably about 780 nm. The linear speed is preferably from 1.2 to 1.4 m/sec, and the recording power may be at a level of from 6 to 9 mW.

by conducting the recording in such a manner, the portions irradiated with the recording laser beam undergo optical changes or, in some cases, physical changes, due to the heat generation reaction of the light absorptive layer. In the following examples, when an injection molded resin is used as the substrate and an organic dye is used for the light absorptive layer, the substrate side of the light absorptive layer may undergo a deformation.

The optical information recording medium thus recorded, may be played back by a usual CD player.

Further, the optical information recording medium of the present invention may have a ROM region formed at a portion thereof. In this manner, it is possible to preliminarily record the same data in a large quantity, and later record optional data of the user's own at the recordable region, and the recorded data can be reproduced by an ordinary CD player.

Now, the present invention will be describe din further detail with reference to examples. However, it should be understood that the present invention is by no means restricted to such specific examples.

EXAMPLE 1 a polycarbonate substrate 1 of a disk shape having a thickness of 1.2 mm, an outer diameter of 120 mm and an inner diameter of 15 mm and having a spiral pregroove formed on its surface with a width of 0.8 μm, a depth of 0.08 μm and a pitch of 1.6 μm, was formed by injection molding.

As a cyanine dye, 0.95 g of 1,1'-dibutyl-3,3,3',3'-tetramethyl-4,5,4',5'-dibenzoindodicarbocyanine perchlorate (product number NK3219, manufactured by Nippon Kanko Shikiso Kenkyusho) was dissolved in 10 ml of an acetylacetone solvent, and the solution was coated on the above substrate 1 by spin coating to form a light absorptive layer 2 having a thickness of 250 nm. The complex refractive index of this light absorptive layer 2 was $n_{abs}=2.7$ and $k_{abs}=0.05$. As mentioned hereinafter, the wavelength of the reading semiconductor laser beam was $\lambda=780$ nm, whereby $\rho=n_{abs}d_{abs}\lambda=0.87$.

Then, a gold film having a thickness of 60 nm was formed by vacuum deposition on the entire surface of this disk, to form a light reflective layer 3. Further, on this light reflective layer 3, an ultraviolet curable resin was spin-coated and then cured by irradiation with ultraviolet rays, to form a protective layer 4 having a thickness of 10 μm.

To the optical disk thus obtained, a semiconductor laser having a wavelength of 780 nm was irradiated at a linear speed of 1.2 m/sec with a recording power of 6.8 mW, to record EFM signals. Then, this optical disk was played back by a commercially available CD player (Aurex XR-V73, wavelength of the reading laser beam λ=780 nm, a laser with a reading power of 0.5 mW), whereby the reflectance of the optical disk was 70.2%, $I_{11}/I_{top}$ obtained from the eye pattern of the read-out signals was 0.9, $I_3/I_{top}$ was 0.6, and the block error rate was $2.0 \times 10^{-3}$.

The CD standards prescribed that the reflectance is at least 70%, $I_{11}/I_{top}$ is at least 0.6, $I_3/I_{top}$ is from 0.3 to 0.7, and the block error rate is at most $3.0 \times 10^{-2}$. The optical disk of this example meets the standards.

EXAMPLE 2

On a polycarbonate substrate 1 molded in the same manner as in Example 1, 1.45 g of the same cyanine dye as used in Example 1 dissolved in 10 ml of an acetylacetone solvent, was coated by spin coating to form a light absorptive layer 2 having a thickness of 410 nm. In this case, $\mu = n_{abs}d_{abs}/\lambda = 1.42$.

In the same manner as in Example 1, a light reflective layer 3 was formed on the entire surface of this disk. Further, on this light reflective layer 3, an ultraviolet curable resin was spin-coated and cured by irradiation with ultraviolet rays to form a protective layer 4 having a thickness of 10 μm.

To the optical disk thus obtained, EFM signals were recorded in the same manner as in Example 1. Then, this optical disk was played back by the same CD player as used in Example 1, whereby the reflectance of the optical disk was 72%, $I_{11}/I_{top}$ was 0.95, $I_3/I_{top}$ was 0.70, and the block error rate was $1.5 \times 10^{-2}$. Thus, the optical disk of this example also meets the CD standards like the preceding example.

EXAMPLE 3

On a polycarbonate substrate 1 molded in the same manner as in Example 1, a solution obtained by dissolving 0.6 g of 1,1'-dipropyl-3,3,3',3'-tetramethylindodicarbocyanine perchlorate and 0.7 g of IRG003 (Nihon Kayaku K.K.) in 10 ml of an acetylacetone solvent, was coated by spin coating to form a light absorptive layer 2 having a thickness of 330 nm. In this case, $\rho = n_{abs}d_{abs}/\lambda = 0.85$, and $k_{abs} = 0.06$.

In the same manner as in Example 1, a light reflective layer 3 was formed on the entire surface of this disk. Further, on this light reflective layer 3, an ultraviolet curable resin was spin-coated and cured by irradiation with ultraviolet rays to form a protective layer having a thickness of 10 μm.

To the optical disk thus obtained, EFM signals were recorded in the same manner as in Example 1. Then, this optical disk was played back by the same CD player as used in Example 1, whereby the reflectance of the optical disk was 71%, $I_{11}/I_{top}$ was 0.85, $I_3/I_{top}$ was 0.45, and the block error rate was $1.0 \times 10^{-2}$. Thus, the optical disk of this example also meets the CD standards like the preceding Examples.

The present invention is not limited to the above examples, and various modifications can be made within the scope of the present invention.

As described in the foregoing, according to the present invention, it is possible to provide an optical information recording medium and a recording method, whereby the reflectance and the degree of modulation prescribed in the CD standards can be satisfied.

What is claimed is:

1. An optical information recording medium comprising a light transmitting substrate, a light absorptive layer having a thickness of from 250 nm to 410 nm containing at least one light absorbing substance formed on the substrate and a light reflective layer made of a metal film formed on the light absorptive layer, wherein an optical parameter represented by $\rho = n_{abs}d_{abs}/\lambda$ wherein $n_{abs}$ is the real part of the complex refractive index of the light absorptive layer, $d_{abs}$ is the average thickness of the light absorptive layer and $\lambda$ is the wavelength of a reading laser beam, is $0.6 < \rho < 1.6$.

2. The optical information recording medium according to claim 1, wherein the imaginary part $k_{abs}$ of the complex refractive index of the light absorptive layer is at most 0.2.

3. The optical information recording medium according to claim 1, wherein the light absorptive layer contains a cyanine dye alone or together with at least one other light absorbing substance.

4. The optical information recording medium according to claim 1, wherein the light absorptive layer contains indodicarbocyanine alone or together with at least one other light absorbing substance.

5. An optical information recording medium comprising a light transmitting substrate, a light absorptive layer containing at least one light absorbing substance formed on the substrate, a light reflective layer made of a metal layer formed on the light absorptive layer and a protective layer formed on the light reflective layer, wherein an optical parameter represented by $\rho = n_{abs}d_{abs}/\lambda$ wherein $n_{abs}$ is the real part of the complex refractive index of the light absorptive layer, $d_{abs}$ is the average thickness of the light absorptive layer and $\lambda$ is the wavelength of a reading laser beam, is $0.6 < \rho < 1.6$, and the imaginary part $k_{abs}$ of the complex refractive index of the light absorptive layer is $0.001 \leq k_{abs} \leq 0.2$.

6. The optical information recording medium according to claim 5, wherein the optical parameter $\rho = n_{abs}d_{abs}/\lambda$ is $0.61 \leq \rho \leq 1.09$, and the imaginary part $k_{abs}$ is $0.001 \leq k_{abs} \leq 0.2$.

7. The optical information recording medium according to claim 5, Wherein the optical parameter $\rho = n_{abs}d_{abs}/\lambda$ is $0.7 > \rho \leq 0.9$, and the imaginary part $k_{abs}$ is $0.01 \leq k_{abs} \leq 0.1$.

8. The optical information recording medium according to claim 5, Wherein the optical parameter $\rho = n_{abs}d_{abs}/\lambda$ is $1.11 \leq \rho \leq 1.59$, and the imaginary part $k_{abs}$ is from $0.001 \leq k_{abs} \leq 0.2$.

9. The optical information recording medium according to claim 5, wherein the optical parameter $\rho = n_{abs}d_{abs}/\lambda$ is $1.25 \leq \rho \leq 1.5$, and the imaginary part $k_{abs}$ is $0.01 \leq k_{abs} \leq 0.08$.

10. The optical information recording medium according to claim 5, wherein the light transmitting substrate has a spiral groove formed on its surface on which the light absorptive layer is formed.

11. The optical information recording medium according to claim 5, wherein the light absorbing substance in the light absorptive layer contains a cyanine dye alone or together with at least one other light absorbing substance.

12. The optical information recording medium according to claim 5, wherein the light absorbing substance in the light absorptive layer contains indodicarbocyanine alone or together with at least one other light absorbing substance.

13. The optical information recording medium according to claim 5, wherein the light absorbing substance in the light absorptive layer is at least one cyanine dye represented by the formula:

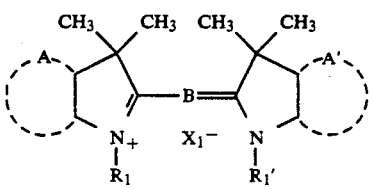

wherein each of A and A which may be the same or different is a group of atoms forming a benzene ring, a substituted benzene ring, a naphthalene ring or a substituted naphthalene ring, B is pentamethylene (—CH=CH—CH=CH—CH=), of which each hydrogen atom may be substituted by a halogen atom, an alkyl group, an alkoxy group or a diphenylamino group, or which may have a substituted or unsubstituted cyclic side chain bridging a plurality of carbon atoms, each of $R_1$ and $R_1'$ which may be the same or different is a substituted or unsubstituted alkyl, alkoxy, alkylhydroxy, aralkyl, alkenyl, alkylcarboxyl or alkylsulfonyl group, or a substituted or unsubstituted alkylcarboxyl or alkylsulfonyl group bonded to an alkali metal ion or an alkyl group, and $X_1^-$ is an anion selected from the group consisting of a halogen atom, perchloric acid, borofluoric acid, benzenesulfonic acid, toluenesulfonic acid, an alkylsulfonic acid, a benzenecarboxylic acid, an alkylcarboxylic acid and a trifluoromethylcarboxylic acid, provided that when $R_1$ and $R_1'$ have a group bonded to an alkali metal ion, $X_1^-$ may be not present.

14. The optical information recording medium according to claim 5, wherein the light reflective layer is made of a film of gold, silver, copper, aluminum or an alloy thereof.

15. The optical information recording medium according to claim 5, wherein the protective layer is made of a photocurable resin.

16. The optical information recording medium according to claim 5, wherein an intermediate layer is formed between the substrate and the light absorptive layer.

17. The optical information recording medium according to claim 5, wherein an intermediate layer is formed between the light absorptive layer and the reflective layer.

18. The optical information recording medium according to claim 5, wherein an intermediate layer is formed between the reflective layer and the protective layer.

19. The optical information recording medium according to claim 5, wherein the light absorptive layer is made of a plurality of layers.

20. A method for recording information on an optical recording medium, wherein the optical recording medium of claim 5 is used, and the recording is conducted by irradiating a laser beam from the substrate side of the medium.

21. A method for recording information on an optical information recording medium, wherein the optical recording medium of claim 5 is used, and the recording is conducted by deforming the substrate side of the light absorptive layer by irradiating a laser beam from the substrate side.

22. A method for producing an optical information recording medium, which comprises injection molding a resin to form a substrate, forming a light absorptive layer on the substrate by spin coating to satisfy the following condition, forming a thin metal film on the light absorptive layer to form a light reflective layer, and forming a photocurable resin on the light reflective layer, said condition being such that an optical parameter represented by $\rho = n_{abs}d_{abs}/\lambda$ wherein $n_{abs}$ is the real part of the complex refractive index of the light absorptive layer, $d_{abs}$ is the average thickness of the light absorptive layer and $\lambda$ is the wavelength of a reading laser beam, is $0.6 < \rho < 1.6$, and the imaginary part $k_{abs}$ of the complex refractive index of the light absorptive layer is $0.001 \leq k_{abs} \leq 0.2$.

* * * * *